US012166867B1

(12) United States Patent
Wang et al.

(10) Patent No.: US 12,166,867 B1
(45) Date of Patent: Dec. 10, 2024

(54) QUANTUM KEY DISTRIBUTION NETWORK WITH CENTRALIZED OPTICAL PULSE GENERATION

(71) Applicant: CABLE TELEVISION LABORATORIES, iNC., Louisville, CO (US)

(72) Inventors: Jing Wang, Broomfield, CO (US); Bernardo Huberman, Palo Alto, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 177 days.

(21) Appl. No.: 17/951,968

(22) Filed: Sep. 23, 2022

Related U.S. Application Data

(60) Provisional application No. 63/247,612, filed on Sep. 23, 2021.

(51) Int. Cl.
*H04B 10/70* (2013.01)
*H04L 9/08* (2006.01)

(52) U.S. Cl.
CPC .......... *H04L 9/0858* (2013.01); *H04B 10/70* (2013.01); *H04L 9/0819* (2013.01)

(58) Field of Classification Search
None
See application file for complete search history.

(56) References Cited

U.S. PATENT DOCUMENTS

| | | | |
|---|---|---|---|
| 7,781,754 B2 | 8/2010 | Loss et al. | |
| 9,374,376 B2 * | 6/2016 | Hunt | H04L 9/0852 |
| 10,171,238 B2 | 1/2019 | Howe et al. | |
| 11,271,661 B2 | 3/2022 | Yoshino | |
| 11,309,970 B2 | 4/2022 | Woodward et al. | |
| 11,496,225 B2 | 11/2022 | Rahman | |
| 11,888,978 B1 * | 1/2024 | Wang | H04L 9/0852 |
| 2023/0393335 A1 * | 12/2023 | Challener | H04L 9/0852 |

* cited by examiner

*Primary Examiner* — Jai M Lee
(74) *Attorney, Agent, or Firm* — Cozen O'Connor

(57) ABSTRACT

A node for a quantum key distribution (QKD) network includes an optical input that receives an optical pulse from a hub of the QKD network and an optical splitter that splits the optical pulse into an optical timing pulse and a pre-qubit pulse. The node also includes a qubit encoder controllable to encode the pre-qubit pulse into a photonic qubit; a qubit trigger circuit that controls, based on the optical timing pulse, the qubit encoder while the pre-qubit pulse propagates through the qubit encoder; and an optical output that transmits the photonic qubit to the hub.

16 Claims, 8 Drawing Sheets

----- Classical
——— Quantum

QUANTUM KEY DISTRIBUTION NETWORK WITH CENTRALIZED OPTICAL PULSE GENERATION

CROSS-REFERENCE TO RELATED APPLICATIONS

This application claims priority to U.S. Provisional Patent Application No. 63/247,612, filed on Sep. 23, 2021, the disclosure of which is incorporated herein by reference in its entirety.

BACKGROUND

Classical cryptography relies on the computational complexity of intractable mathematical problems to protect keys, such as integer factorization for RSA algorithm, discrete logarithm for Diffie-Hellman key exchange, and elliptic-curve discrete logarithm for elliptic-curve cryptography. Although intractable on classical computers, these problems can be solved in polynomial time on a quantum computer. Even worse, increasing the key length, which used to be an effective countermeasure to deal with ever-growing computational power, does not help since the required qubit number on a quantum computer only scales linearly with the key length.

Quantum key distribution (QKD) is a prominent candidate to address the challenge of quantum computers. Instead of computational security, it guarantees information-theoretic security by quantum mechanics, i.e., a key cannot be broken even if the adversary has unlimited computing power. However, it was found later that the absolute security of QKD is only guaranteed for ideal single-photon sources and detectors, which do not exist in practice. The gaps between ideal and realistic devices become the new security loopholes and may be exploited for side-channel attacks. For example, weak coherent pulses (WCP) are used as a low-cost replacement for a single-photon source. Its photon number per pulse follows the Poisson distribution and the multi-photon pulses could become the target of a photon-number-split attack. Decoy-state protocols were invented to vary the photon number per pulse to eliminate this loophole. Another example is that an ideal single-photon source should have random phases for each pulse, but in practice, the phase of a WCP is not truly random, which could become the target of an unambiguous-state-discrimination attack. This loophole can be patched by using directly modulated lasers (DML) or phase modulators for active phase randomization. So far, all loopholes on the photon source side have been addressed and security loopholes only originate from imperfections of detectors, e.g., the time-shift attack exploits the efficiency mismatch between detectors, the detector blinding attack exploits the after-gate pulses and dead time of avalanche photon detectors (APD).

Measurement-device-independent (MDI) QKD protocols were proposed to remove loopholes on the detector side. In conventional prepare-and-measure QKD protocols, a user, Alice, prepares and sends quantum states to another user, Bob, who performs measurements on the received states. In an MDI-QKD protocol, Alice and Bob prepare random quantum states independently and send their photons to a third party, Charlie, who performs a Bell-state measurement (BSM) with the photons. Charlie only publicly announces the results of successful BSMs. Since Charlie only knows whether a successful BSM was performed, but cannot tell the qubits from Alice and Bob, he serves as an untrusted relay that could even be in the control of an eavesdropper. The post-selection of successful BSMs entangles the qubits from Alice and Bob, which is why MDI-QKD is equivalent to a time-reversed entangled-photon-pair (EPR) protocol. During the key sifting, Alice and Bob only keep those bits for successful BSMs as the raw keys and discard the others. During the basis reconciliation, Alice and Bob reveal their choices of bases via an authenticated public channel and only keep those bits in which they use identical bases. After that, post-processing including error correction and privacy amplification is performed for the final key distillation.

Since there is no key leakage at the relay node, MDI-QKD closes all detection loopholes and is immune to side-channel attacks even if the detection system is controlled by an eavesdropper. For standardizing QKD, certification of detection systems has been a major hurdle since detector manufacturers can leave backdoors and steal key information from these loopholes. MDI-QKD solves this problem since there is no need for detector certification.

Despite the advantages of MDI-QKD, it is difficult to scale MDI-QKD to a full network. Since MDI-QKD requires indistinguishability between the photons from the users in terms of time, phase, polarization, and wavelength, conventional implementations of an MDI-QKD network require auxiliary links between each pair of users. As each user has an independent laser, these auxiliary links are used to guarantee that photons from different users arrive with identical timing, phase, polarization, and wavelength. Consequently, when a new node is added, a new auxiliary link is required from each existing node in the network to the new node. This requirement causes the number of auxiliary links to scale quadratically with the number of nodes in the network and makes a scalable implementation of MDI-QKD network difficult.

SUMMARY

The present embodiments include systems and methods for a scalable polarization-encoding measurement-device-independent (MDI) quantum key distribution (QKD) network utilizing centralized optical pulse generation. In centralized optical pulse generation technique, the relay node hosts a light source that is shared by all user nodes. Advantageously, as the same light source is shared by all user nodes and is used for encoding qubits, this technique eliminates auxiliary calibration links by integrating wavelength calibration links into existing classical fibers from each user node to the relay node. The present embodiments simplify the topology of MDI-QKD networks, lower deployment costs, and makes a scalable multi-user QKD network possible.

In embodiments, a node for a QKD network includes an optical input that receives an optical pulse from a hub of the QKD and an optical splitter that splits the optical pulse into an optical timing pulse and a pre-qubit pulse. The node also includes a qubit encoder controllable to encode the pre-qubit pulse into a photonic qubit, a qubit trigger circuit that controls, based on the optical timing pulse, the qubit encoder while the pre-qubit pulse propagates through the qubit encoder; and an optical output that transmits the photonic qubit to the hub.

In other embodiments, a hub for a QKD network includes first and second modulators, first and second optical outputs, first and second optical inputs, a Bell-state measurer, and an electronic delay unit. The first modulator, when triggered, modulates a first optical beam to generate a first optical pulse. The second modulator, when triggered, modulates a second optical beam to generate a second optical pulse, where the first and second optical beams have the same wavelength. The first and second optical outputs transmit the respective first and second optical pulses to a first and second nodes of the QKD network, respectively. The first and second optical inputs receive first and second photonic qubits from the respective first and second nodes. The Bell-state measurer performs a Bell-state measurement with the first and second photonic qubits. The electronic delay unit (i) triggers the first modulator at a first delay time and (ii) triggers the second modulator at a second delay time different from the first delay time such that the first and second photonic qubits arrive simultaneously at the Bell-state measurer.

In other embodiments, a method for QKD network includes triggering, at a first time, a first modulator to generate a first optical pulse from a first optical beam and triggering, at a second time different from the first time, a second modulator to generate a second optical pulse from a second optical beam, where the first and second optical beams having the same wavelength. The method also includes transmitting the first optical pulse to a first node of the quantum key distribution network and transmitting the second optical pulse to a second node of the quantum key distribution network. The method also includes synchronously receiving, after said transmitting the first optical pulse and said transmitting the second optical pulse, a first photonic qubit from the first node and a second photonic qubit from the second node. The method also includes performing a Bell-state measurement with the first and second photonic qubits.

DETAILED DESCRIPTION

In a scalable architecture for measurement-device-independent quantum key distribution (MDI-QKD), user nodes are connected to an untrusted central hub, Charlie. When a user, Alice, wants to transmit a quantum key to another user, Bob, Alice generates photonic qubits that she transmits to Charlie via an optical fiber. Bob similarly generates photonic qubits that he transmits to Charlie via optical fiber. Charlie performs Bell-state measurements with Alice's and Bob's qubits and publicly announces whether each measurement was successful. To enhance success of the Bell-state measurements, Alice's and Bob's qubits should be indistinguishable to Charlie. For example, both qubits have the same wavelength/frequency, arrival time, polarization, and phase.

The following description includes devices and methods that allow Alice and Bob to have the same wavelength/frequency, time delay, polarization, and phase of their transmitted qubits, thereby ensuring indistinguishability to Charlie. The present embodiments are applicable to all encoding schemes used for MDI-QKD including polarization encoding and time-bin phase-encoding. In an example implementation, Charlie transmits optical pulses from a laser to both Alice and Bob by first splitting the output of the laser and modulating each output into optical pulses before sending the optical pulses to Alice and Bob. Alice and Bob then encode the received optical pulses into photonic qubits and transmit the photonic qubits to Charlie. By encoding the received optical pulses into photonic qubits, both received photonic qubits maintain the same wavelength. Charlie may delay, depending on distances to Alice and Bob, sending one or both optical pulses to maintain the same arrival time for the photonic qubits from Alice and Bob.

Advantageously, the present embodiments enable scalable MDI-QKD networks by eliminating the need for auxiliary channels between Alice and Bob. Each new node added to the network requires only one uplink and one downlink between the new node and Charlie, and thus the number of links scales linearly with the number of users (i.e., is "scalable"). By contrast, for a network with auxiliary channels between all pairs of users, the number of links scales quadratically with the number of users. The present embodiments therefore reduce the number of links needed to implement an MDI-QKD network and, as a result, reduce cost and simplify network maintenance.

Figures 1A, 1B, 1C:
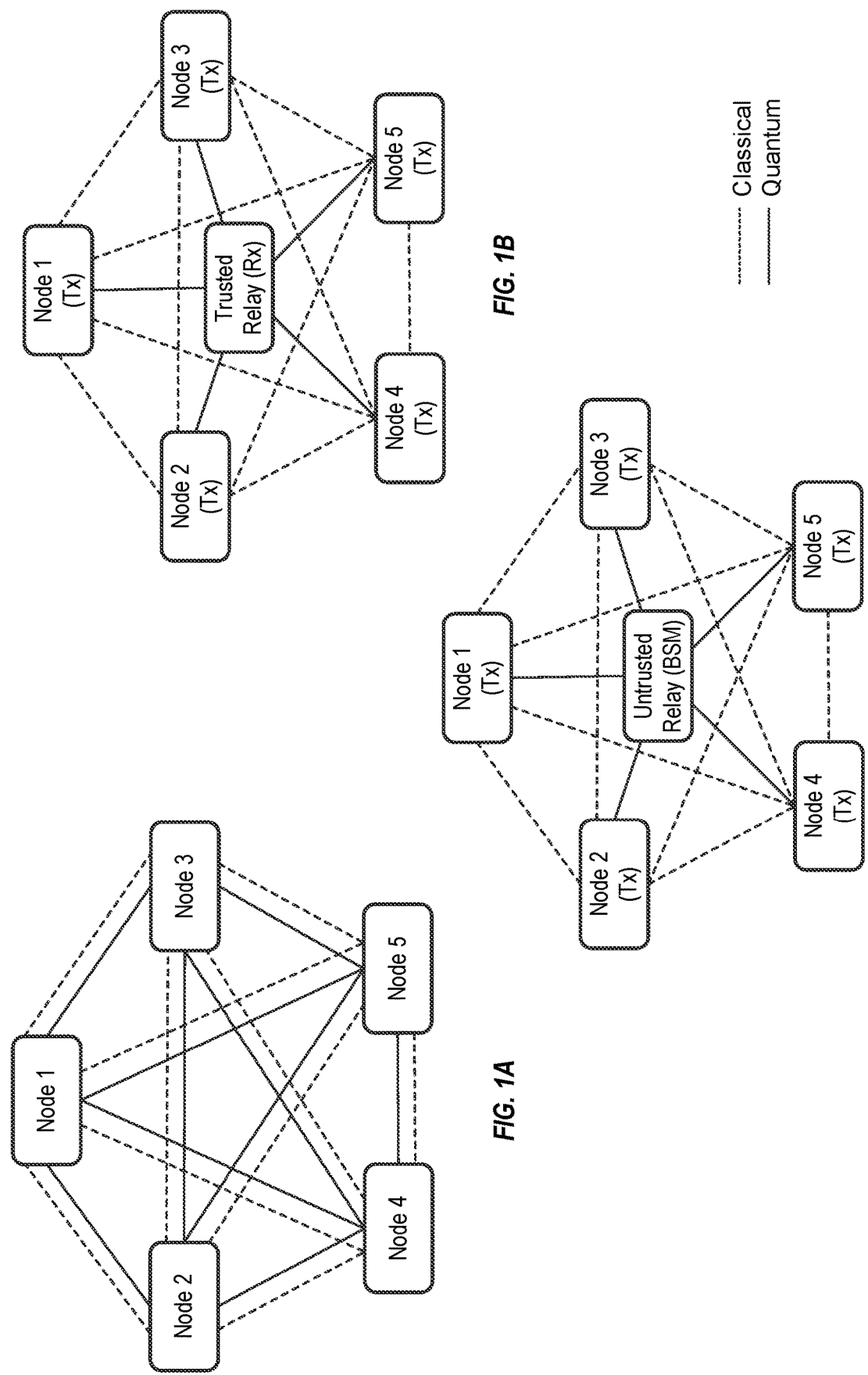
FIG. 1A shows a point-to-point network topology.
FIG. 1B shows a trusted-relay network topology in which each user node exchanges keys with a trusted relay node.
FIG. 1C shows an untrusted-relay network topology for measurement-device-independent quantum key distribution (MDI-QKD).

FIG. 1A shows a point-to-point network topology. Most prepare-and-measure QKD protocols utilize this point-to-point network topology and cannot handle more complicated topologies. In FIG. 1A, each classical communication link needs a dedicated quantum link for key exchange. Accordingly, the number of quantum links increases quadratically with the number of user nodes. As a result, the point-to-point network topology is expensive and impractical to deploy even though it is resilient against cyber-attacks since one compromised user node does not affect the security of the other user nodes.

FIG. 1B shows a trusted-relay network topology in which each user node exchanges keys with a trusted relay node. This topology simplifies the QKD network by reducing the number of quantum links. Specifically, only one quantum link is needed when adding a new user node. Given the imbalanced hardware requirements of WCP sources and SPDs, expensive SPDs are concentrated in the relay node and shared among multiple user nodes, leaving only WCP sources at each user node. This topology reduces system cost and eases deployment but places the overall network security solely on the relay node. Since the relay node knows all the keys, once it is compromised, the whole network is breached.

FIG. 1C shows an untrusted-relay network topology for MDI-QKD. By replacing the trusted relay node with an untrusted relay node, any two user nodes can exchange their keys via the untrusted relay node without any information being leaked. In MDI-QKD, two user nodes send independently prepared quantum states to the untrusted relay node. The untrusted relay node is used as a public detection server to perform BSM on the incoming WCPs and publicize whether or not the BSMs were successful. Since the untrusted relay node has no information about the states that Alice and Bob sent, it does not need to be trusted or certified. MDI-QKD is more resilient than the trusted-relay topology of FIG. 1C since an attack on the untrusted relay node provides no information about the keys.

Figure 2B:
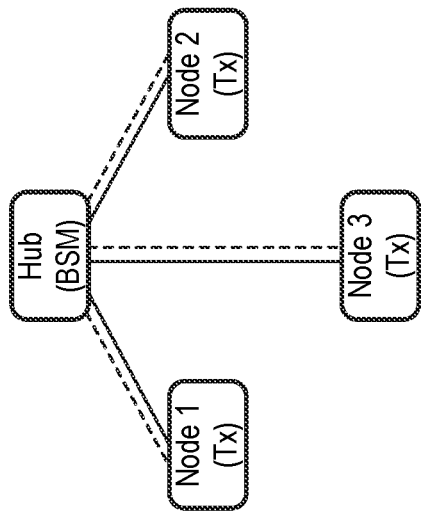
FIG. 2B is an example diagram showing a scalable architecture for MDI-QKD network.
Figure 2A:
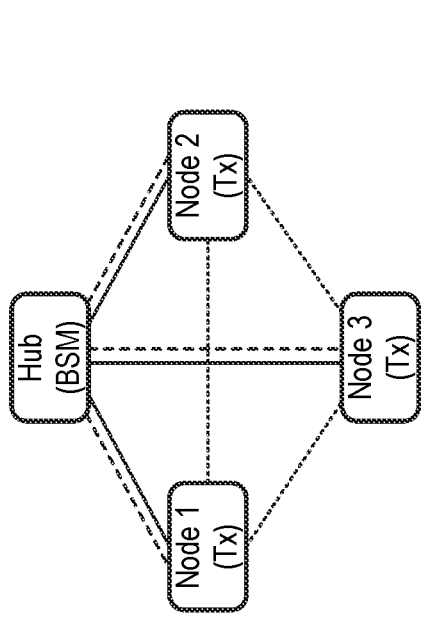
FIG. 2A is an example diagram of an MDI-QKD network showing auxiliary service channels.

FIG. 2A is an example diagram of an MDI-QKD network showing auxiliary service channels. Despite the advantages of MDI-QKD, no scalable architecture for MDI-QKD networks has yet been discovered. This is because existing MDI-QKD networks need additional classical communication links between every pair of user nodes. These additional links, referred to as auxiliary service channels, are shown in FIG. 2A. To guarantee the indistinguishability of WCPs, these auxiliary service channels are used for timing, wavelength, and polarization calibrations between user nodes. Every time a new user node is added to the network, new auxiliary links need to be deployed to all existing user nodes. The total number of auxiliary links therefore increases quadratically with the number of users.

FIG. 2B is an example diagram showing a scalable architecture for MDI-QKD network. In the scalable architecture, auxiliary service channels are advantageously incorporated into existing classical communication links between each user node and the relay, as shown in FIG. 2B. By removing auxiliary service links, the network topology is simplified and easier to deploy and service. When a new user node is added, only one classical link and one quantum link are needed.

Figure 3A:
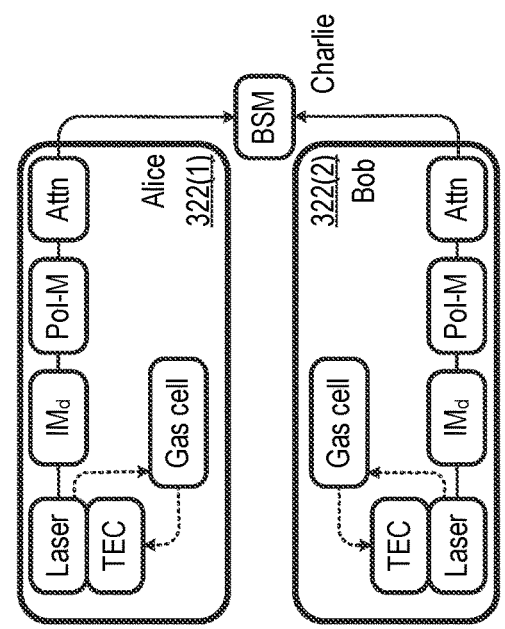
FIG. 3A shows an example implementation of MDI-QKD network that performs wavelength calibration by measuring the wavelength difference between two nodes.
Figure 3B:
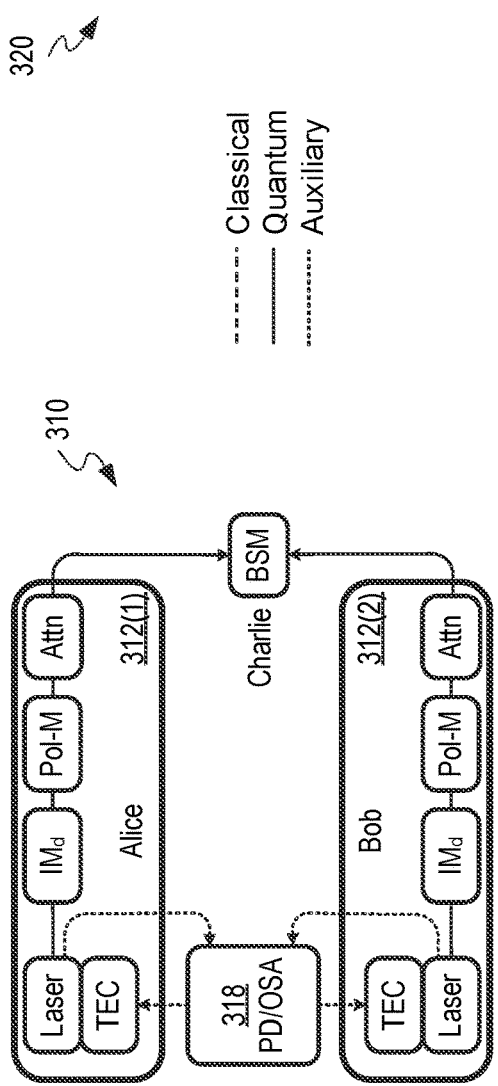
FIG. 3B shows an example implementation of MDI-QKD network that performs wavelength calibration by laser locking to an atomic or molecular absorption line at each node.

In MDI-QKD systems, to guarantee the indistinguishability between photons from independent lasers of two users, timing, wavelength, and polarization calibrations between two lasers are needed. While delay and polarization control techniques are mature and well-known in the art, wavelength calibration remains a challenge. For instance, the wavelength increases linearly with the temperature at 0.08-0.1 nm per 1° C. FIGS. 3A and 3B show existing techniques for wavelength calibration. Both of these techniques utilize similar laser diodes at each user node to ensure that their central wavelengths and full widths at half maximum are as close to each other as possible. When the wavelengths are the same (e.g., to within a threshold or tolerance level), the wavelengths are said to be calibrated. Each laser diode may include or be in contact with a thermoelectric cooler (TEC) or heater to tune its wavelength by controlling its temperature.

FIG. 3A shows an example implementation of MDI-QKD network 310 that performs wavelength calibration by measuring the wavelength difference between two nodes 312(1) and 312(2). The difference is measured by an optical detector 318 that may include a photodetector (PD) or an optical spectrum analyzer (OSA). When the detector 318 is a PD, the beat frequency is measured between the lasers from each user (Alice and Bob). The outputs of Alice's and Bob's lasers are combined at the PD to create the beat note, whose frequency is monitored. When using an OSA, the OSA directly measures the wavelength difference. If the difference in frequency between Alice's and Bob's lasers exceeds a threshold (e.g., 10 MHz), a feedback control circuit adjusts the TEC of one or both of the lasers to bring their wavelengths back into calibration. This technique maybe suitable for a laboratory environment but is expensive due to the cost of OSA, and the precision of the wavelength control may be limited by the resolution of the PD or OSA. Furthermore, this technique is not scalable since a photodetector/OSA and a feedback circuit are needed in the auxiliary link between the users. Furthermore, FIG. 3B shows an example implementation of MDI-QKD network 320 that performs wavelength calibration by laser locking to an atomic or molecular absorption line at each node 322(1) and 322(2). A gas cell, such as HCN, is integrated into the laser system and locks the wavelength to a molecular absorption line. This solution provides the highest precision and stability of wavelength control and eliminates any auxiliary link among users. But it is expensive for real-world deployment due to the high cost of the gas cell and optics needed to probe and detect the absorption line for each frequency-locked laser.

Figure 3C:
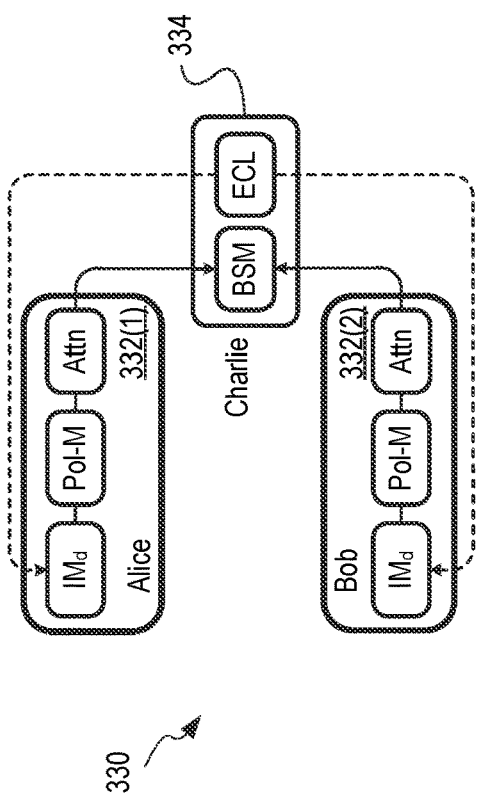
FIG. 3C shows an example implementation of MDI-QKD network that performs the centralized optical pulse generation.

FIG. 3C shows an example implementation of MDI-QKD network 330 that performs centralized optical pulse generation. An external cavity laser (ECL) at the relay node sends pulses to each user via existing classical fiber links, where the pulses are used as a light source for the following intensity/polarization modulation and serve as the clock reference for time calibration. Since this method of wavelength calibration uses existing classical links between the relay node and the user nodes, this solution needs no auxiliary links. This solution not only simplifies the network topology but also lowers the cost of each user. Compared with the implementations shown in FIGS. 3A and 3B, the cost of an ECL is significantly lower than frequency-locked lasers or deploying auxiliary service links. More importantly, the cost of an ECL is shared by multiple users. Advantageously, in some existing networks, ECLs are already equipped at the hub for classical communications, which further reduces deployment cost.

Figure 4:
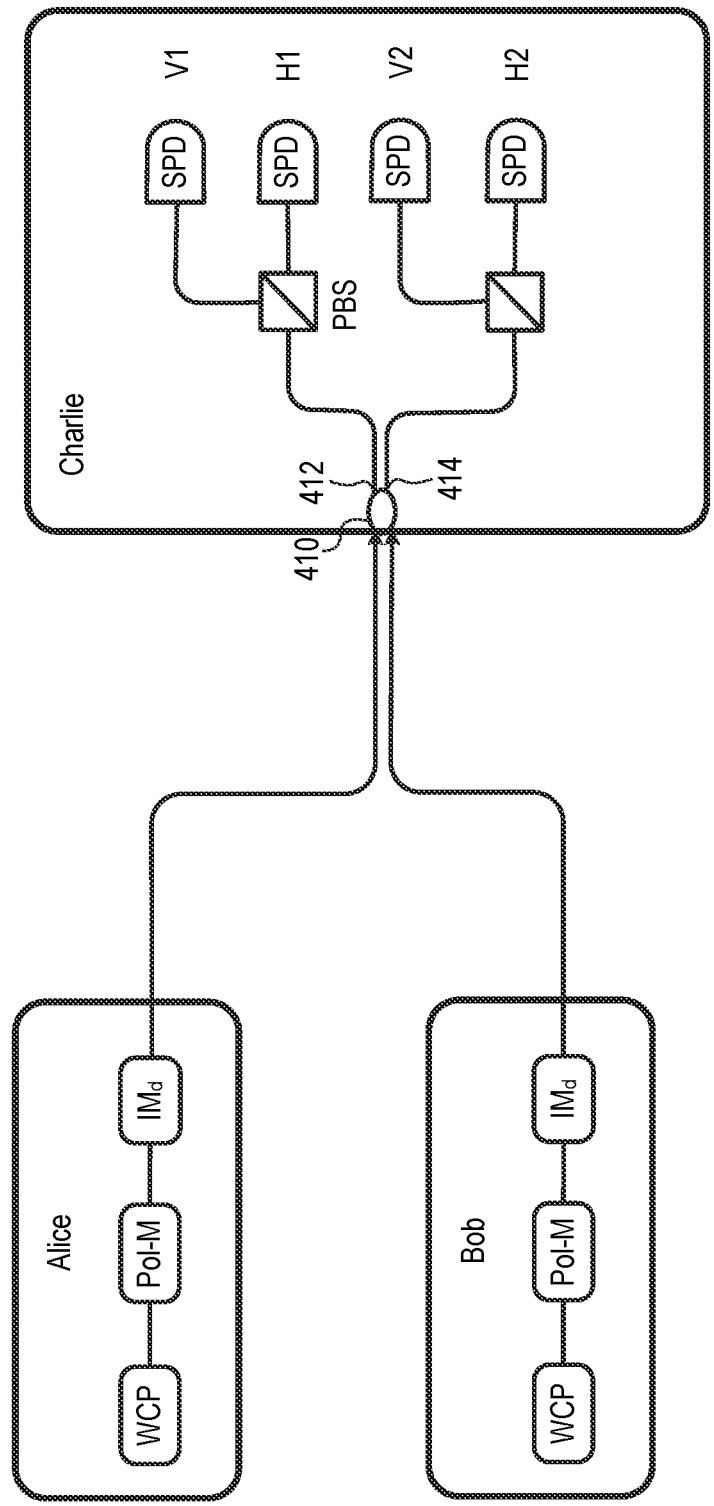
FIG. 4 is a functional diagram of a polarization-encoding MDI-QKD network, in an embodiment.

FIG. 4 is a functional diagram of a polarization-encoding MDI-QKD network. Alice and Bob encode qubits onto four polarization states in two conjugate bases: rectilinear (0°, 90°) and diagonal (+45°). They independently prepare four polarization states using WCPs and polarization modulators (Pol-M) and send pulses to an untrusted relay Charlie for BSM. To close the loophole of the photon-number-split attack, both Alice and Bob use an intensity modulator (IMd) to adjust the photon number per pulse for the decoy-state generation. At Charlie, the two photons from Alice and Bob interfere at a 50:50 beam splitter (BS) and are projected to the horizontal (H)/vertical (V) states by two polarization beam splitters (PBS). The incoming photons are then detected by four SPDs and registered by a time-interval analyzer (TIA).

A successful BSM is defined as a coincidence detection event at two orthogonal SPDs, which connect to either the same or different PBS. H1+V1 and H2+V2 correspond to a triplet state $|\psi^+\rangle = (|HV\rangle + |VH\rangle)/\sqrt{2}$ of an entangled photon pair; H1+V2 and H2+V1 correspond to a singlet state $|\psi^-\rangle = (|HV\rangle - |VH\rangle)/\sqrt{2}$. All other detection events, such as single SPD events and coincidence events of two SPDs with identical polarization (H1+H2, V1+V2), are ignored. The post-selection of successful BSMs entangles the two photons from Alice and Bob, but Charlie has no information about which one is which, so he does not know the qubit Alice/Bob sent. Since Charlie only registers two out of four Bell states, this measurement is also called a partial BSM. In key sifting, Charlie publicly announces the results of successful BSMs. Alice and Bob select those bits from successful BSMs as raw keys and discard the rest. During the key reconciliation, Alice and Bob reveal their basis choices over an authenticated public channel, keeping those bits prepared in the same basis and discarding others prepared in incompatible bases. After that, error correction and privacy amplification are performed for key distillation.

According to the photon bunching effect of Hong-Ou-Mandel (HOM) interference, when two indistinguishable photons with identical frequency and polarization enter a 50:50 beam splitter at the same time, they exit together via the same output port. For example, for the rectilinear basis, if Alice and Bob send photons with 0° polarization, the two photons exit a beam splitter 410 together. When they both exit via a port 412 of beam splitter 410, they are both projected to H1, whereas when they exit via a port 414, they are both projected to H2. On the other hand, if the two photons are prepared at 90°, they are both projected to V1 or V2. In these cases, only one SPD receives photons at a time. Considering Alice and Bob prepare photons in orthogonal polarizations, 0°, and 90°, if the two photons exit the splitter 410 via the same port, they are projected to H1+V1 or H2+V2, corresponding to a triplet state. If they exit via different ports, they are projected to H1+V2 or H2+V1, corresponding to a singlet state.

For the diagonal basis, if Alice and Bob prepare photons with the same polarization (e.g., both −45° or 45°), then two photons leave the splitter 410 via the same port. Taking port 1 as an example, there are three possible outcomes: (i) both photons are projected to H1, (ii) both photons are projected to V1, and (iii) one is projected to H1, and the other one is projected to V1. The outcome (iii) is a triplet state. If Alice and Bob prepare photons in orthogonal polarizations (e.g., one at −45° and the other at 45°), and if two photons exit via the same port, according to the photon bunching effect, the photons are projected to the same detector (i.e., both at H1 or V1 if they exit via port 412, or both at H2 or V2 if they exit via port 414). There is no coincidence between two SPDs. If the two photons exit via different ports, there are four possible outcomes: (i) H1+H2, (ii) V1+V2, (iii) H1+V2, and (iv) V1+H2. The outcomes (iii) and (iv) are singlet states. Unlike the rectilinear basis, for the diagonal basis, the occurrence of singlet and triplet states are therefore exclusive. For example, triplet states are only allowed when Alice and Bob prepare the same polarization, whereas singlet states are only allowed when they prepare orthogonal polarizations. The following table summarizes these combinations.

The following table shows the required bit flip after key exchange. For the rectilinear basis, successful BSMs only occur when Alice and Bob prepare photons with orthogonal polarizations, so either one of them needs to flip the bit. For the diagonal basis, bit flip is still needed for singlet states, but for triplet states, no bit flip is needed. In summary, either Alice or Bob needs to flip his/her bit unless they use the diagonal basis and Charlie receives a triplet state.

| | | BSM results | |
|---|---|---|---|
| | | Singlet state (H1 + V2, V1 + H2) | Triplet state (H1 + V1, H2 + V2) |
| Tx basis | Rectilinear | Complementary bits | Complementary bits |
| | Diagonal | Complementary bits | Same bit |

Figure 5:
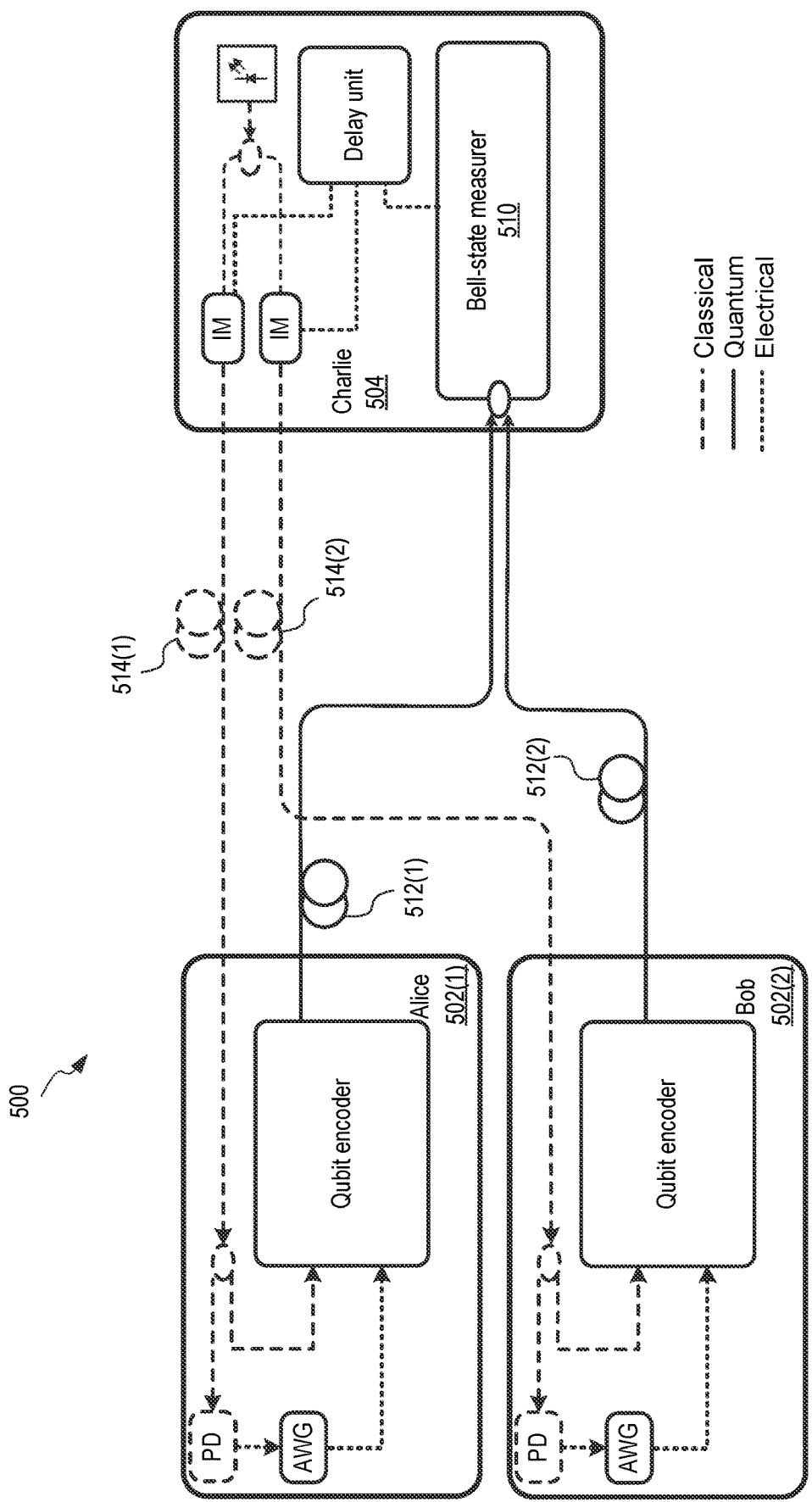
FIG. 5 shows an example implementation of a polarization-encoding MDI-QKD network 500 based on centralized optical pulse generation.
Figure 6:
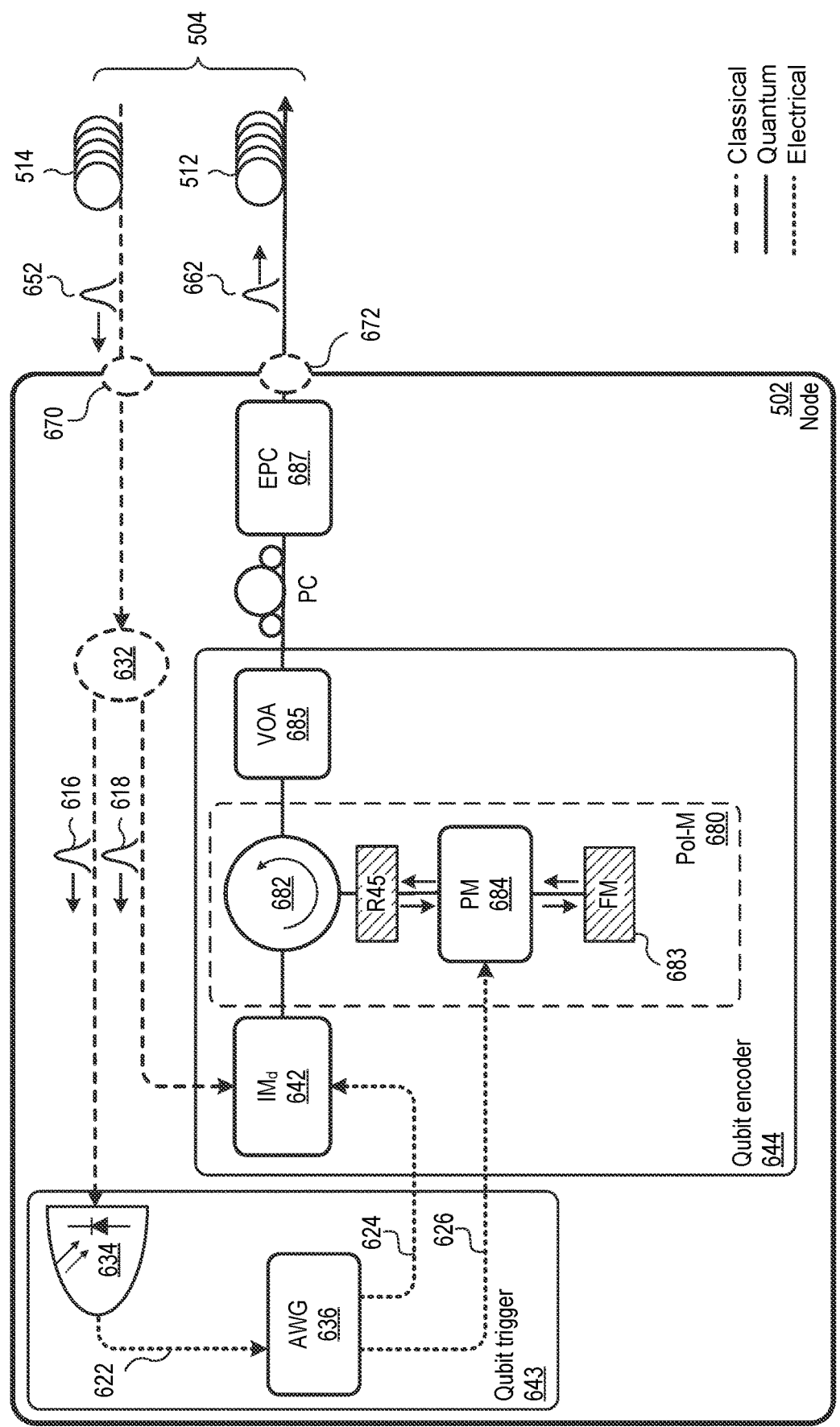
FIG. 6 is a functional diagram of a user node may be either of the user nodes of FIG. 5.
Figure 7:
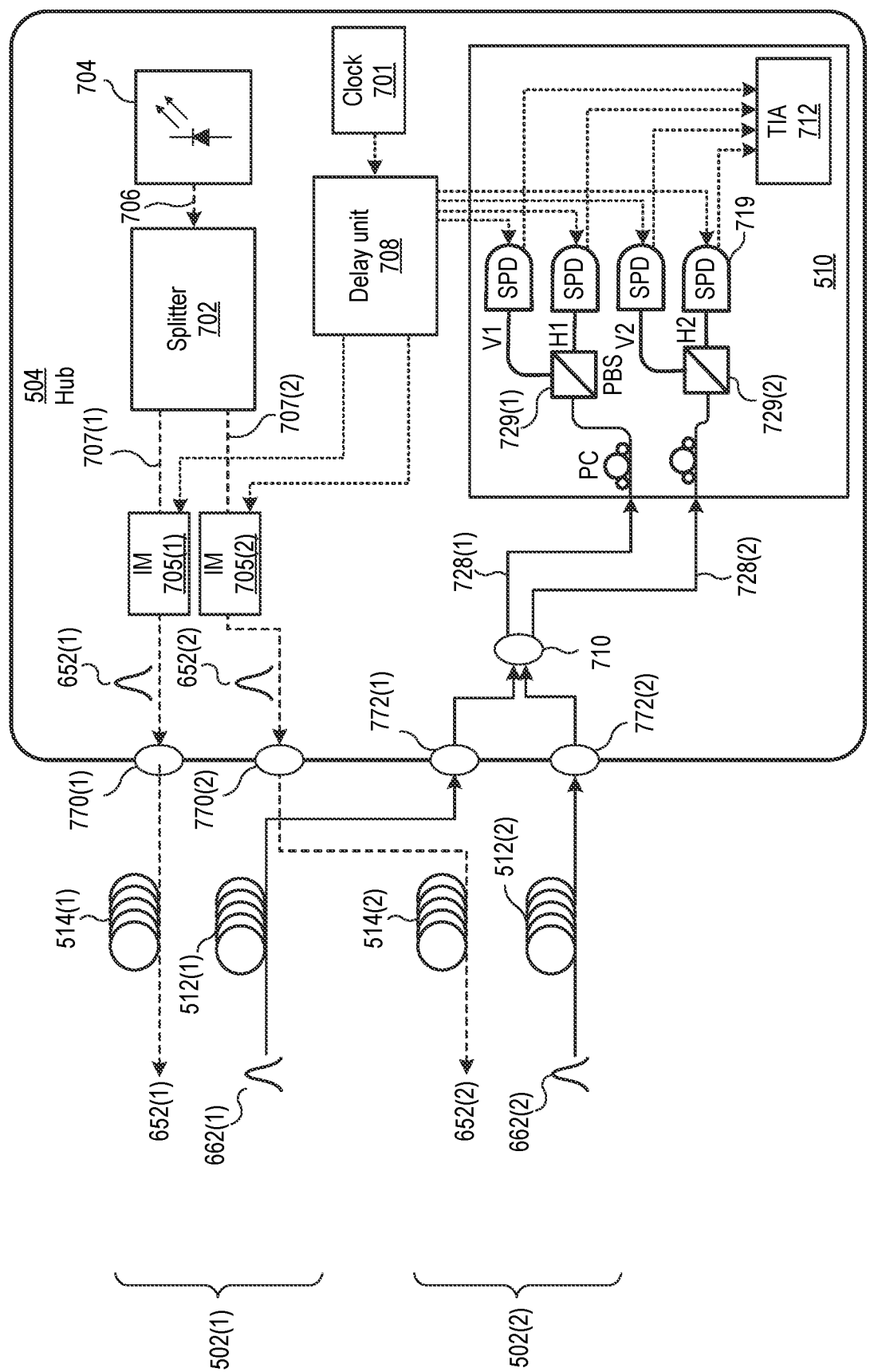
FIG. 7 is a functional diagram of the hub of FIG. 5.

FIG. 5 shows an example implementation of a polarization-encoding MDI-QKD network 500 that uses centralized optical pulse generation. MDI-QKD network 500, which is an example of MDI-QKD network 330 of FIG. 3C, includes user nodes (Alice and Bob) 502(1) and 502(2) and a hub (Charlie) 504, which are examples of respective users 332(1) and 332(2) and the hub 334. FIG. 6 is a functional diagram of a user node 502 that may be either of the user nodes 502(1) and 502(2) of FIG. 5. FIG. 7 is a functional diagram of the hub 504 of FIG. 5. For clarity, FIGS. 5, 6, and 7 are best viewed together in the following description.

The nodes 502(1) and 502(2) and the hub 504 are configured for polarization encoding. In FIG. 5, quantum communication links are shown as solid black lines, classical communication links are shown as dashed lines, and all other auxiliary connections are shown as dotted lines. In this example, instead of a complicated and expensive wavelength calibration scheme, the centralized optical pulse generation is used to reduce the deployment cost by eliminating the auxiliary links among users (e.g., FIG. 3A).

The hub 504 includes a beam splitter 702, intensity modulators 705(1) and 705(2), a delay unit 708, and a Bell-state measurer 510. The Bell-state measurer 510 is an example of the BSM shown for Charlie in FIG. 4. BSMs in other implementations may have different numbers of SPDs and optical splitters. The hub 504 also includes a light source 704 in the figure but may include more light sources. A single optical beam 706 from the light source 704 is split by

| | | Alice | | | |
|---|---|---|---|---|---|
| | | 0° (bit 0) | 90° (bit 1) | −45° (bit 0) | 45° (bit 1) |
| Bob | 0° (bit 0) | 2 × H1<br>2 × H2 | H1 + V1 (triplet)<br>H2 + V2 (triplet)<br>H1 + V2 (singlet)<br>V1 + H2 (singlet) | Incompatible bases<br>Discarded during<br>basis reconciliation | |
| | 90° (bit 1) | H1 + V1 (triplet)<br>H2 + V2 (triplet)<br>H1 + V2 (singlet)<br>V1 + H2 (singlet) | 2 × V1<br>2 × V2 | | |
| | −45° (bit 0) | Incompatible bases<br>Discarded during<br>basis reconciliation | | 2 × H1, 2 × V1<br>H1 + V1 (triplet)<br>2 × H2, 2 × V2<br>H2 + V2 (triplet) | 2 × H1, 2 × V1<br>2 × H2, 2 × V2<br>H1 + H2, V1 + V2<br>H1 + V2 (singlet)<br>V1 + H2 (singlet) |
| | 45° (bit 1) | | | 2 × H1, 2 × V1<br>2 × H2, 2 × V2<br>H1 + H2, V1 + V2<br>H1 + V2 (singlet)<br>V1 + H2 (singlet) | 2 × H1, 2 × V1<br>H1 + V1 (triplet)<br>2 × H2, 2 × V2<br>H2 + V2 (triplet) | the beam splitter 702 into first and second optical beams 707(1) and 707(2). The intensity modulators 705(1) and 705(2) modulate the first and second optical beams 707(1) and 707(2) into respective first and second optical pulses 652(1) and 652(2).

In another embodiment, the light source 704 comprises two lasers phase-locked together or frequency-locked to a common spectroscopy cell. In another embodiment, one laser is used to injection-lock a second laser. In these embodiments, the beam splitter 702 is not needed; however, the two intensity modulators 705(1) and 705(2) are still needed to modulate the first and second optical beams 707(1) and 707(2).

In another embodiment, the intensity modulators 705(1) and 705(2) are located in the respective nodes 502(1) and 502(2). In such an embodiment, the first and second optical beams 707(1) and 707(2) are propagated to the respective nodes 502(1) and 502(2) along with timing information. The timing information may be sent to the nodes 502(1) and 502(2) via classical communication channels and may include an electronic trigger for each node. At the nodes 502(1) and 502(2), the first and second optical pulses 652(1) and 652(2) may then be generated from the received first and second optical beams, respectively, using the timing information. The optical pulses 652(1) and 652(2) may also be generated using internal light sources at the nodes 502(1) and 502(2) using the timing information.

The hub 504 includes optical outputs 770(1) and 770(2) that transmit the optical pulses 652(1) and 652(2) to the respective nodes 502(1) and 502(2) via optical fibers 514(1) and 514(2). The hub 504 also includes optical inputs 772(1) and 772(2) that receive the photonic qubits 662(1) and 662(2) from the respective nodes 502(1) and 502(2) via optical fibers 512(1) and 512(2).

While the example in FIG. 5 shows the optical fibers 514(1), 514(2), 512(1), and 512(2) for transmitting the optical pulses 652(1) and 652(2) and receiving the photonic qubits 662(1) and 662(2), free-space optics may be used in place of the optical fibers. For example, when using physical connections among the components of an MDI-QKD network is impractical, such as a space-bound satellite being used as a hub, free-space optics may replace optical fibers. Additionally, a single optical fiber may replace two optical fibers between a hub and a node. For example, the optical fibers 514(1) and 512(1) between the hub 504 and the node 502(1) may be replaced with a single optical fiber. The single optical fiber, in this case, combines both classical and quantum channels by using a method that may include wavelength separation, time separation, or a combination thereof.

The intensity modulators 705(1) and 705(2) are triggered by the delay unit 708. The delay unit 708, which may include a master clock 701, triggers the modulators 705(1) and 705(2) with different delay times, such that the photonic qubits from both nodes 502(1) and 502(2) arrive simultaneously at the Bell-state measurer 510, where each delay time may depend on the distance to each node. The delay times for the modulators 705(1) and 705(2) may be calibrated by (i) triggering the modulator 705(1) to generate a first calibration pulse that is transmitted to the node 502(1), (ii) measuring the first delay time based on when the hub 504 detects the first calibration pulse transmitted back to the hub by the node 502(1), (iii) triggering the modulator 705(2) to generate a second calibration pulse that is transmitted to the node 502(2), and (iv) measuring the second delay time based on when the hub 504 detects the second calibration pulse transmitted back to the hub 504 by the node 502(2). Additionally, the delay unit 708 triggers the gated SPDs 719 for the detection of the received photonic qubits.

The node 502 includes an optical input 670, an optical splitter 632, a qubit encoder 644, a qubit trigger circuit 643, and an optical output 672. The optical input receives the optical pulse 652 from the hub 504. The optical splitter 632 splits the optical pulse 652 into an optical timing pulse 616 and a pre-qubit pulse 618. The qubit encoder 644 then encodes the pre-qubit pulse 618 into a photonic qubit 662. The qubit trigger circuit 643 controls the qubit encoder 644 while the pre-qubit pulse 618 propagates through the qubit encoder 644. The control is accomplished by a photodetector 634 and a waveform generator 636 in the qubit trigger circuit 643. The photodetector 634 converts the optical timing pulse 616 into an electronic trigger signal 622. The waveform generator 636, when triggered by the electronic trigger signal 622, outputs control signals 624 and 626 to the qubit encoder 644. The optical output 672 then transmits the photonic qubit 662 to the hub 504 via optical fiber 512.

Advantageously, the first and second optical beams from the beam splitter 702, having the same wavelength, and sent to each node via existing classical fiber links. At each node, the received pulses are split into two branches. One is used as the light source for following intensity/polarization modulation, and the other is received by a photodetector (PD) and serves as the clock reference for time calibration.

The qubit encoder 644 includes an intensity modulator 642 and a polarization modulator 680. The intensity modulator 642, controlled by the control signal 624 from the qubit trigger circuit 643, adjusts the photon number per pulse for the decoy-state generation. The polarization modulator 680, controlled by the control signal 626 from the qubit trigger circuit 643, includes an optical circulator 682, a phase modulator 684, and a Faraday mirror 683 to generate four polarization states for the BB84 protocol. Pulses passing through the phase modulator 684 have a polarization of 45° to the optical axis of the waveguide in the phase modulator 684. By modulating the relative phase shift between two principal modes in the waveguide, four polarization states are generated. The Faraday mirror 683 reflects the pulses with 90° rotation, so each pulse passes through the phase modulator 684 waveguide twice with orthogonal polarizations with polarization mode dispersion and temperature-induced polarization variation compensated. A variable optical attenuator (VOA) 685 reduces the pulse intensity to a single-photon level before the photonic qubit 662 is transmitted to the hub 504. At the Bell-state measurer 510, the two photonic qubits 662(1) and 662(2) from the two nodes 502(1) and 502(2) interfere at a 50:50 beam splitter 710, and 50:50 split beams 728(1) and 728(2) are projected to horizontal (H1 and H2) and vertical (V1 and V2) states by two PBSs 729(1) and 729(2). They are detected by four SPDs 719 and registered by a TIA 712.

Advantageously, this solution embeds the wavelength and timing calibration channels into the classical fibers from the hub to user nodes and eliminates any auxiliary links among the user nodes for wavelength calibration. The MDI-QKD network 500, when compared to existing MDI-QKD networks shown in FIGS. 3A and 3B, has a simplified topology, reduced cost, and is scalable for more than two users. The deployment of a costly light source at the hub 504 is less expensive than deploying auxiliary links among users (e.g., MDI-QKD network of FIG. 3A) or using frequency-locked lasers at each user (e.g., MDI-QKD network of FIG. 3B). Moreover, the cost of the light source 704 may be shared by all users. In some networks, the hub/relay nodes may already be equipped with an ECL, which further reduces the cost.

Polarization calibration ensures that Alice and Bob have identical frames of polarizations. For the rectilinear basis, Alice's and Bob's H/V states need to be aligned to the polarizing axes of PBSs 729(1) and 729(2) of the hub 504. The polarization controller (PC) at each user node may be used for this purpose. For example, rectilinear basis may be aligned by (i) adjusting the VOA 685 to increase the pulse intensity, (ii) sending horizontally polarized pulses from the node 502, and (iii) adjusting the PC to minimize the detection rate in SPDs 719 for the vertical polarization.

An electrical polarization controller (EPC) 687 in the user node 502 introduces phase retardation between the polarization components along with its slow and fast axes. The EPC 687 only changes the phase shift between H and V polarizations but does not disturb the previously aligned rectilinear basis. With the rectilinear basis aligned, aligning the diagonal basis is equivalent to adjusting the phase shift between the H and V polarization components. For example, aligning the diagonal basis may be accomplished by (i) aligning Alice's H state to the EPC's fast/slow axis, and (ii) adjusting the DC voltage of EPC until Alice's diagonal basis is aligned with Bob's. Finally, the visibility of HOM interference may be used to monitor the indistinguishability between the two photons from Alice and Bob. The HOM dip reflects the overall interference condition and can be used to calibrate all modes including timing, wavelength, and polarization. Once time and wavelength are calibrated, HOM visibility only depends on the polarization difference.

Figure 8:
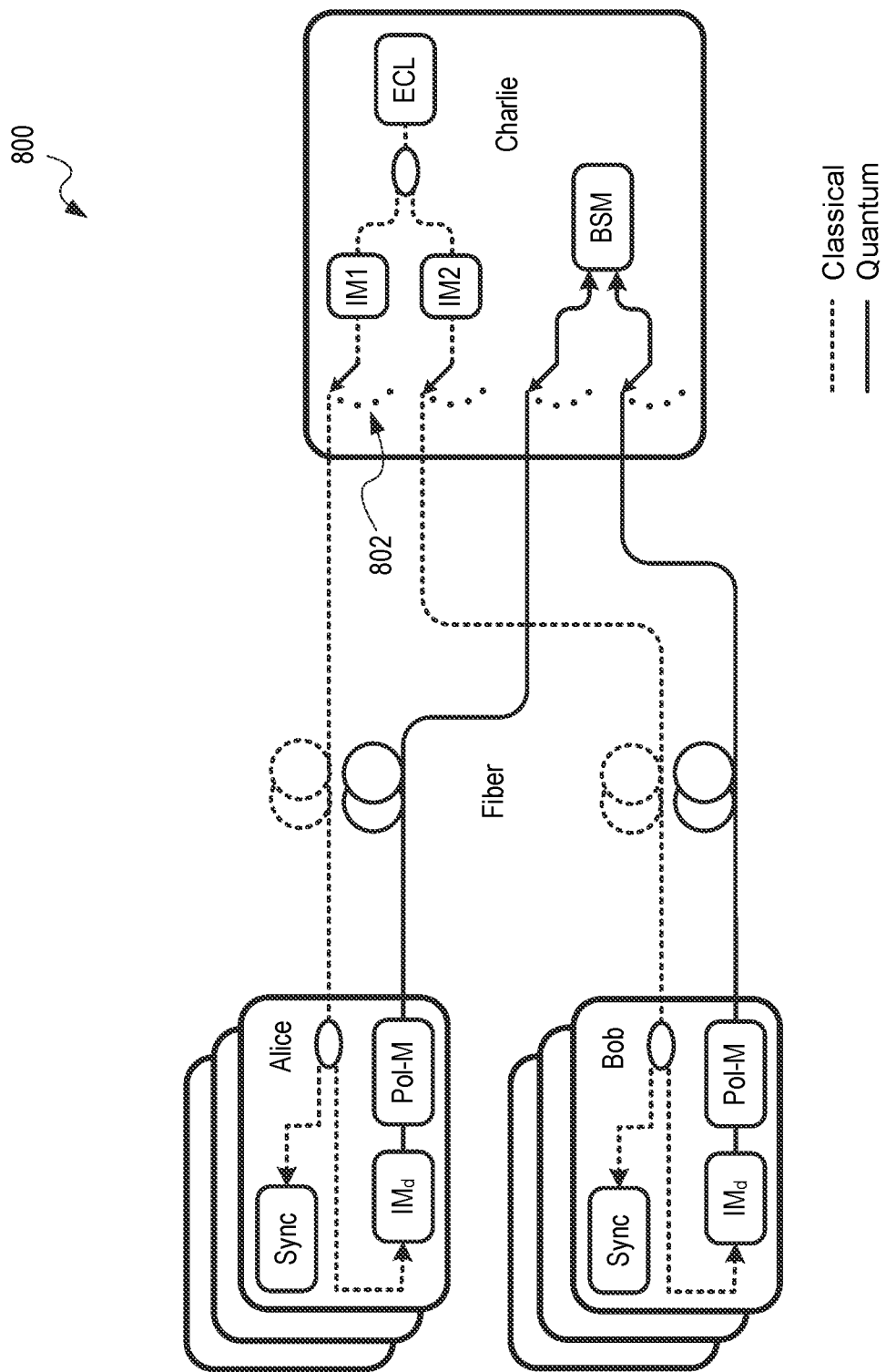
FIG. 8 shows an MDI-QKD network that is a scalable multi-user implementation of the MDI-QKD network of FIG. 5.

FIG. 8 shows an MDI-QKD network 800 that is a scalable multi-user implementation of a MDI-QKD network 500 of FIG. 5. An additional user node (e.g., see node 502 in FIG. 6) may be added to the MDI-QKD network 800 by having only commercial off-the-shelf components that include modulators, polarization controllers, and VOAs. Advantageously, in terms of scalability, the hub now includes optical switches 802 that select the pair of user nodes to connect, and no new auxiliary links need to be added from the new user to existing ones, keeping the operation and upgrade costs low.

A system and method for a scalable multi-user polarization-encoding MDI-QKD network (e.g., MDI-QKD network 800) based the centralized optical pulse generation are described herein. This design integrates the wavelength and timing calibration channels into the classical fiber links between the hub and each user and does not require any auxiliary links among users. It not only simplifies the network topology but also lowers the cost of each user. Compared with existing MDI-QKD solutions, the proposed MDI-QKD network has simplified topology, reduced cost, and is scalable for more than two users. In addition, the cost of an ECL is shared by multiple users, which is much lower than deploying auxiliary links or using frequency-locked lasers at each user. To add new users, only commercial off-the-shelf components are needed for a new user and there is no need to upgrade the relay node, keeping both operation and upgrade costs low.

Since the key generation in MDI-QKD is based on coincident detection events of two SPDs, its key rate has a quadratic dependence on the detection efficiency of both SPDs. So MDI-QKD has higher requirements for detection efficiency than regular prepare-and-measure protocols. Thanks to the centralization of expensive SPDs in the relay node and cost-sharing among multiple users, it is cost-effective to exploit low-temperature superconducting nanowire single-photon detectors with detection efficiency greater than 90%.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A node for a quantum key distribution network, comprising:
    an optical input configured to receive an optical pulse from a hub of the quantum key distribution network;
    an optical splitter configured to split the optical pulse into an optical timing pulse and a pre-qubit pulse;
    a qubit encoder configured to encode the pre-qubit pulse into a photonic qubit;
    a qubit trigger circuit configured to control, based on the optical timing pulse, the qubit encoder while the pre-qubit pulse propagates through the qubit encoder; and
    an optical output configured to transmit the photonic qubit to the hub.

2. The node of claim 1, the qubit trigger circuit comprising a photodetector configured to convert the optical timing pulse into an electronic trigger signal.

3. The node of claim 2, the qubit trigger circuit further comprising a waveform generator that, in response to being triggered by the electronic trigger signal, outputs one or more control signals to the qubit encoder.

4. The node of claim 1, the photonic qubit being a single-photon pulse.

5. The node of claim 1, the photonic qubit being a weakly coherent pulse.

6. The node of claim 1, the qubit encoder comprising one or both of an intensity modulator and a polarization modulator.

7. The node of claim 6, the polarization modulator comprising a circulator, a phase modulator, and a Faraday mirror.

8. The node of claim 1, further comprising an optical delay unit configured to delay the pre-qubit pulse.

9. A method for quantum key distribution network, comprising:
    receiving an optical pulse from a hub of the quantum key distribution network;
    splitting the optical pulse into an optical timing pulse and a pre-qubit pulse;
    encoding, based on the optical timing pulse, the pre-qubit pulse into a photonic qubit; and
    transmitting the photonic qubit to the hub.

10. The method of claim 9, further comprising converting, with a photodetector, the optical timing pulse into an electronic trigger signal.

11. The method of claim 10, wherein:
    the method further comprises triggering a waveform generator with the electronic trigger signal; and
    the waveform generator, in response to said triggering, outputs one or more control signals used for said encoding.

12. The method of claim 9, the photonic qubit being a single-photon pulse.

13. The method of claim 9, the photonic qubit being a weakly coherent pulse.

14. The method of claim 9, wherein said encoding comprises encoding the pre-qubit pulse with one or both of an intensity modulator and a polarization modulator.

15. The method of claim 14, wherein said encoding the pre-qubit pulse with a polarization modulator comprises encoding the pre-qubit pulse with a circulator, a phase modulator, and a Faraday mirror.

16. The method of claim 9, further comprising delaying the pre-qubit pulse.

* * * * *